Dec. 8, 1925.

B. MARTIN 1,564,602

ATTACHMENT FOR STOVE LID GRILLS

Filed June 22, 1925

INVENTOR
Bruno Martin

BY
George B. Willcox.
ATTORNEY

UNITED STATES PATENT OFFICE.

BRUNO MARTIN, OF SAGINAW, MICHIGAN.

ATTACHMENT FOR STOVE-LID GRILLS.

Application filed June 22, 1925. Serial No. 38,808.

*To all whom it may concern:*

Be it known that I, BRUNO MARTIN, a citizen of the United States, residing at Saginaw, in the county of Saginaw and State of Michigan, have invented certain new and useful Improvements in Attachments for Stove-Lid Grills; and I do hereby declare the following to be a full, clear, and exact description of the invention, such as will enable others skilled in the art to which it appertains to make and use the same.

This invention pertains to stove lids or open-work plates or grills above the burner, upon which cooking utensils are placed. Such grills are usually of circular shape and consist of a single casting having concentric rings and radially disposed bars or fingers that project toward the center.

Such grills frequently have their radial fingers of insufficient height so that the annular space between the ring members and the bottom of the cooking utensil is restricted, thereby retarding circulation of the burned gases along the bottom of the utensil and causing disagreeable odors from the gas.

The object of my improvement is to provide a device adapted to be applied to the inwardly projecting fingers of such grills, whereby the height of the fingers is increased so that the utensil will be supported above the ring members.

The hot gases are by this means permitted to flow freely between the fingers and above the ring members, spreading evenly over the area of the bottom of the utensil to be heated. Moreover, the increased height of the fingers improves the effectiveness of combustion and prevents odors by keeping the relatively cool bottom of the utensil above that part of the flame in which complete combustion is attained.

A further object of my invention is to provide an attachment for the above mentioned purposes that is simple in construction, inexpensive to manufacture and capable of being easily applied to existing forms of grills.

With the foregoing and certain other objects in view which will appear later in the specifications, my invention comprises the devices described and claimed and the equivalents thereof.

In the drawings, Fig. 1 is a plan view of a grill with my improvement attached.

Figure 1:
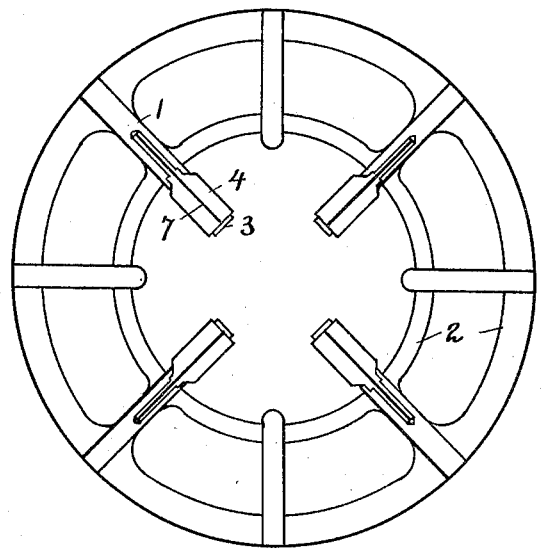

As is clearly shown in the drawings, the usual grill consists in the radial fingers 1 which are usually associated with the concentric rings 2.

Figures 3, 4:
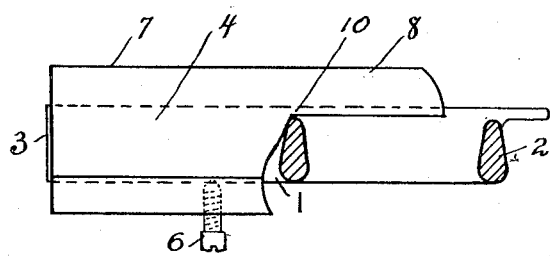
Fig. 3 is an end view.
Fig. 4 is a view similar to Fig. 2, showing a modified form of the device.
Figure 2:
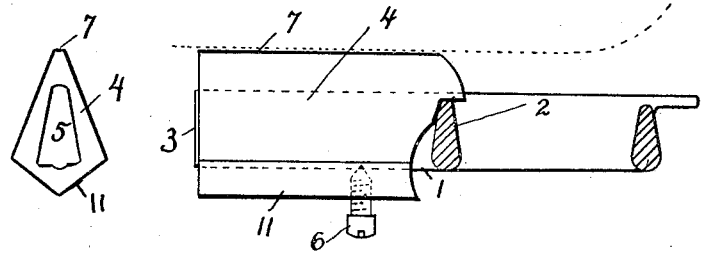
Fig. 2 is an enlarged sectional view, taken on line 2—2 of Fig. 1, showing a preferred form.

To increase the height of the inwardly projecting ends 3 of the fingers 1, as above described, I provide my improved attachment, which consists in the body 4 formed with a longitudinal aperture 5 of approximately the shape of the finger, and adapted to be slipped over the finger, as shown in Figs. 2 and 4. A clamping device, as a screw 6, is threaded in the under side of the body for releasably securing the body to the finger.

The body is preferably formed with an upwardly projecting ridge 7 extending longitudinally of the body and above the finger.

In the form shown in Fig. 2 the ridge is extended, as at 8, above the radial fingers 1, so as to support a larger area of the bottom of the utensil to be heated. The utensil is indicated by dotted lines in Fig. 4.

In the modified form of Fig. 4, the body is shown without the extended ridge 8.

To more rigidly clamp the body to the finger, and to prevent rocking, an end of the body is formed with a shoulder 10, adapted to closely engage the top of the ring 2, as shown in Fig. 4. The device is easily applied by merely slipping the body over the finger and tightening the screw 5. Usually four of the devices are applied to a single grill, as shown in Fig. 1.

The hot gases are then free to pass between the fingers and the ring members, as indicated by the arrows in Fig. 2.

The lower part of the body is preferably formed with upwardly flaring sides 11 to more evenly deflect the hot gases, as shown in Fig. 3.

Having thus described my invention, what I claim and desire to secure by Letters Patent is:

An attachment for the fingers of stove lid grills comprising a body formed with an aperture to receive said finger, an upwardly projecting ridge extending longitudinally along said body and projecting beyond said body and above said finger, and clamping means for releasably securing said body to said finger.

In testimony whereof, I affix my signature.

BRUNO MARTIN.